United States Patent
Mancinelli

Patent Number: 5,975,476
Date of Patent: Nov. 2, 1999

[54] EYEGLASS HOLDER TO BE SECURED TO A VISOR

[76] Inventor: Ricci J. Mancinelli, 4036 B Via Diego, Santa Barbara, Calif. 93110

[21] Appl. No.: 09/165,032

[22] Filed: Oct. 2, 1998

[51] Int. Cl.[6] .................................................... A47G 1/10
[52] U.S. Cl. ........................................ 248/316.7; 248/902
[58] Field of Search .............................. 248/902, 231.81, 248/316.7, 309.1, 229.16, 229.1

[56] References Cited

U.S. PATENT DOCUMENTS

| | | |
|---|---|---|
| 4,715,575 | 12/1987 | Kamerer . |
| 5,082,225 | 1/1992 | Nespoli . |
| 5,340,071 | 8/1994 | Fox, II ................................ 248/231.81 |
| 5,372,345 | 12/1994 | Schmidt . |
| 5,408,728 | 4/1995 | Wisniewski ......................... 248/902 X |
| 5,794,312 | 8/1998 | O'Mahoney . |

*Primary Examiner*—Ramon O. Ramirez

[57] ABSTRACT

A holder for securing eyeglasses to a visor. The holder has two parts; a body, and a clip. The body has a top, a bottom, two sides, a back, and a front with a cavity, a ramp, and a bridge guide. The ramp ascends at the front, peaks at approximately the center of the cavity, then descends as it approaches the end of the cavity. The bridge guide starts thinnest at the front and gradually widens as is approaches the end of the cavity. The body receives the bridge of eyeglasses by manually sliding eyeglasses up the ramp, along the bridge guide and into the open cavity with the temple bars of eyeglasses on the top of the body. The clip is the length of the top of the body. The clip is flexible, resilient and curved on one end forming a clamp for securing to a visor with the other end curved in the opposite direction of the clamp forming a hook for attaching the clip to the back of the body. The flexibility of the clip enables the temple bars of eyeglasses to be held firmly between the top of the body and the visor. The combination of the body and the clip forms the complete eyeglass holder, and accepts and holds various styles and sizes of eyeglasses.

5 Claims, 3 Drawing Sheets

EYEGLASS HOLDER TO BE SECURED TO A VISOR

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable

BACKGROUND—FIELD OF THE INVENTION

The present invention related to a holder for securing eyeglasses, more specifically, the holder attaches to a visor found in automobiles for storing eyeglasses in a convenient, easy to use, and non-obstructive location.

BACKGROUND—DESCRIPTION OF PRIOR ART

Many people for both functional and aesthetic purposes use eyeglasses. They can be costly to replace. Losing, breaking, and scratching eyeglasses are some of the reasons people have to replace their eyeglasses. My invention helps to eliminate these reasons for replacement, when in an automobile.

An eyeglass holder for an automobile must be convenient, easy to use, and non-obstructive, both physically and visually, to the operator of the vehicle.

A few holders for securing eyeglasses to a visor exist, but they are missing some important features. U.S. Pat. No. 5,372,345 to Schmidt (1994) is a holder designed to mount to a visor but requires more manipulation to apply and remove the eyeglasses. U.S. Pat. No. 4,715,575 to Kamerer (1987) discloses a complex holder which is costly to reproduce. U.S. Pat. No. 5,794,312 to O'Mahony (1998) is costly to reproduce and complex to use in an automobile or the like. U.S. Pat. No. 5,082,225 to Nespoli (1992) requires extra manipulation and secures eyeglasses too loosely.

BRIEF SUMMARY OF THE INVENTION—OBJECTS AND ADVANTAGES

Several objects and advantages of the present invention of the holder for securing eyeglasses to a visor are:

(a) to provide ease of use (one hand manipulation) especially when operating a vehicle.

(b) to provide flexibility in accepting eyeglasses of all shapes and sizes.

(c) to hold eyeglasses firmly without touching the lenses.

(d) to hold eyeglasses flush against the visor to eliminate visual and physical obstruction to the operator of the vehicle.

(e) inexpensive to reproduce or manufacture.

(f) lightweight, which keeps the visor from moving into unwanted positions.

REFERENCE NUMERALS IN DRAWINGS

| | |
|---|---|
| 1. Temple Bars | 2. Eyeglass Bridge |
| 4. Visor | 5. Clamp |
| 6. Ramp | 7. Bridge Guide |
| 8. Cavity | 9. Clip |
| 10. Body | 11. Bottom of Body |
| 12. Top of Body | 13. Back of Body |
| 14. Slit in Back of Body | 15. Eyeglass Brims |
| 16. Eyeglass Hinge | 17. Gap |
| 18. Side of Body | 19. Hook |

SUMMARY

In accordance with the present invention, a holder for eyeglasses comprises a body for accepting eyeglasses having a cavity, a ramp, and a bridge guide; also comprises a flexible, resilient clip having a clamp at one end and a hook at the opposite end for securing the body and eyeglasses to a visor.

DESCRIPTION

Figure 2:
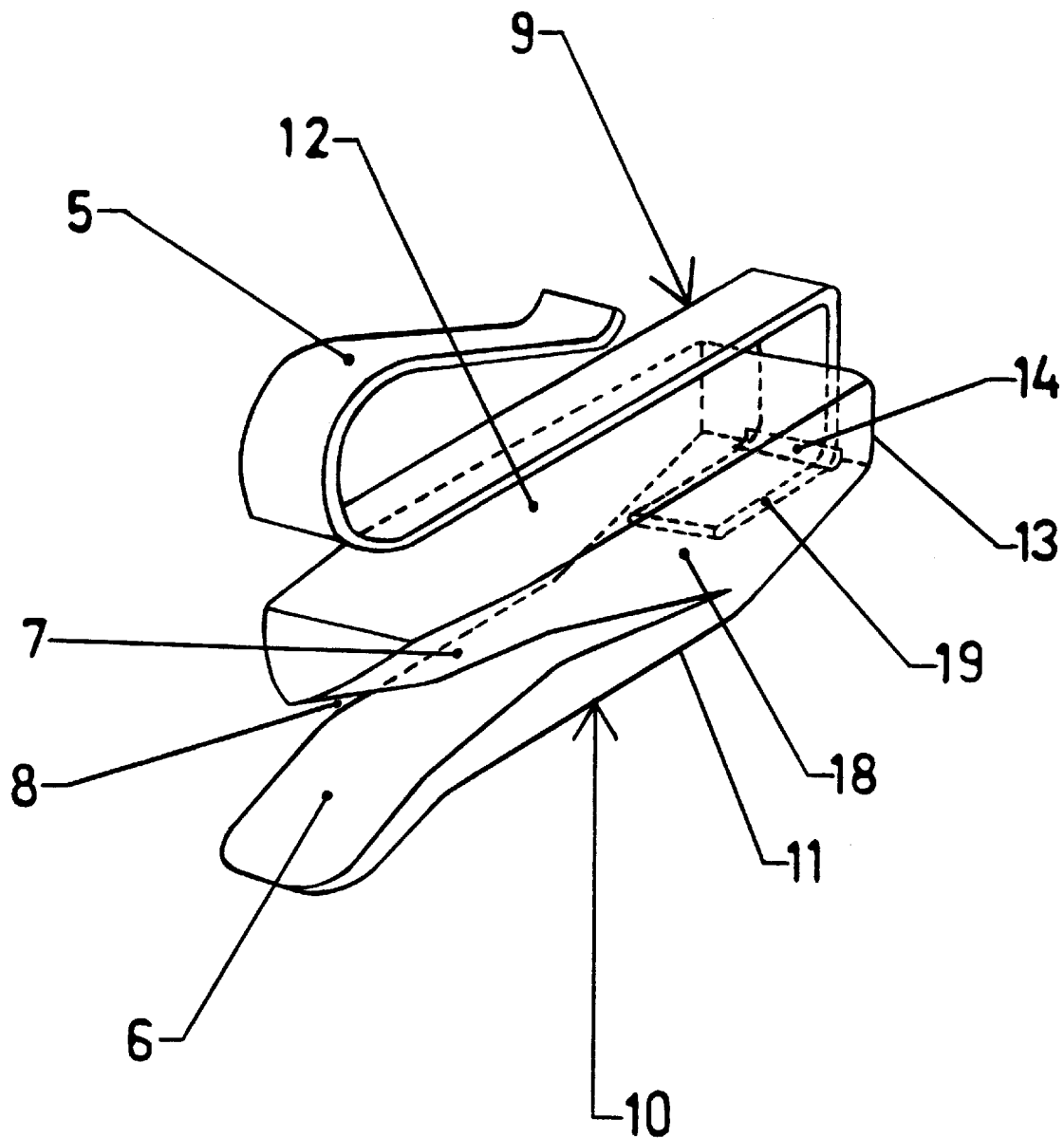
FIG. 2 is a perspective view of this invention, the eyeglass holder.

A typical embodiment of the eyeglass holder is illustrated in FIG. 2. The eyeglass holder of this invention consists of two parts, a body 10, and a clip 9. The body has a top 12, a bottom 11, two sides 18, a back 13 with a slit 14, and an open front end consisting of a ramp 6, a cavity 8, and a bridge guide 7. The ramp 6 is an extension of the bottom 11 of the body 10, and as a whole is longer than the top 12 of the body 10. Starting at the front end, the ramp 6 gradually ascends peaking at approximately the center of the cavity 8, then gradually descends towards the closing of the cavity 8. The cavity 8 is most open at the front end and gradually closes as it approaches the center of the body 10. The bridge guide 7 is thinnest at the front end and gradually widens as it approaches the center of the body 10.

The clip 9 is made of a flexible, resilient material. The clip 9 is approximately the length of the top 12 of the body 10. At the front end the clip 9 is curved to form a clamp 5. At the back end the clip is curved in the opposite direction of the clamp 5 to form a hook 19. The clip 9 runs parallel to the top 12 of the body 10. The hook 19 end of the clip attaches to the back 13 of the body 10 at the slit 14 forming the completed eyeglass holder.

OPERATION

Figure 1:
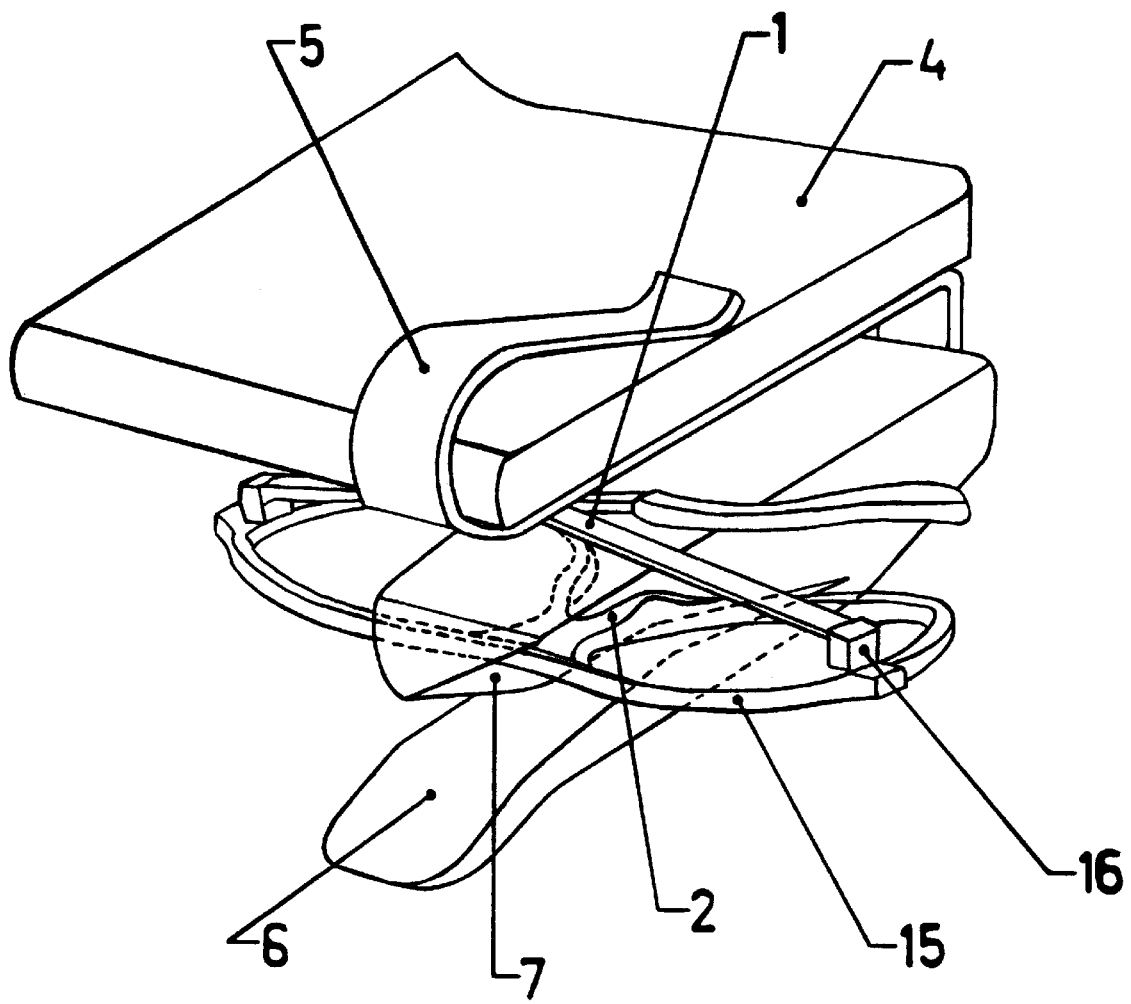
FIG. 1 is a perspective view of this invention, the holder with sunglasses inserted and attached to visor.
Figure 3:
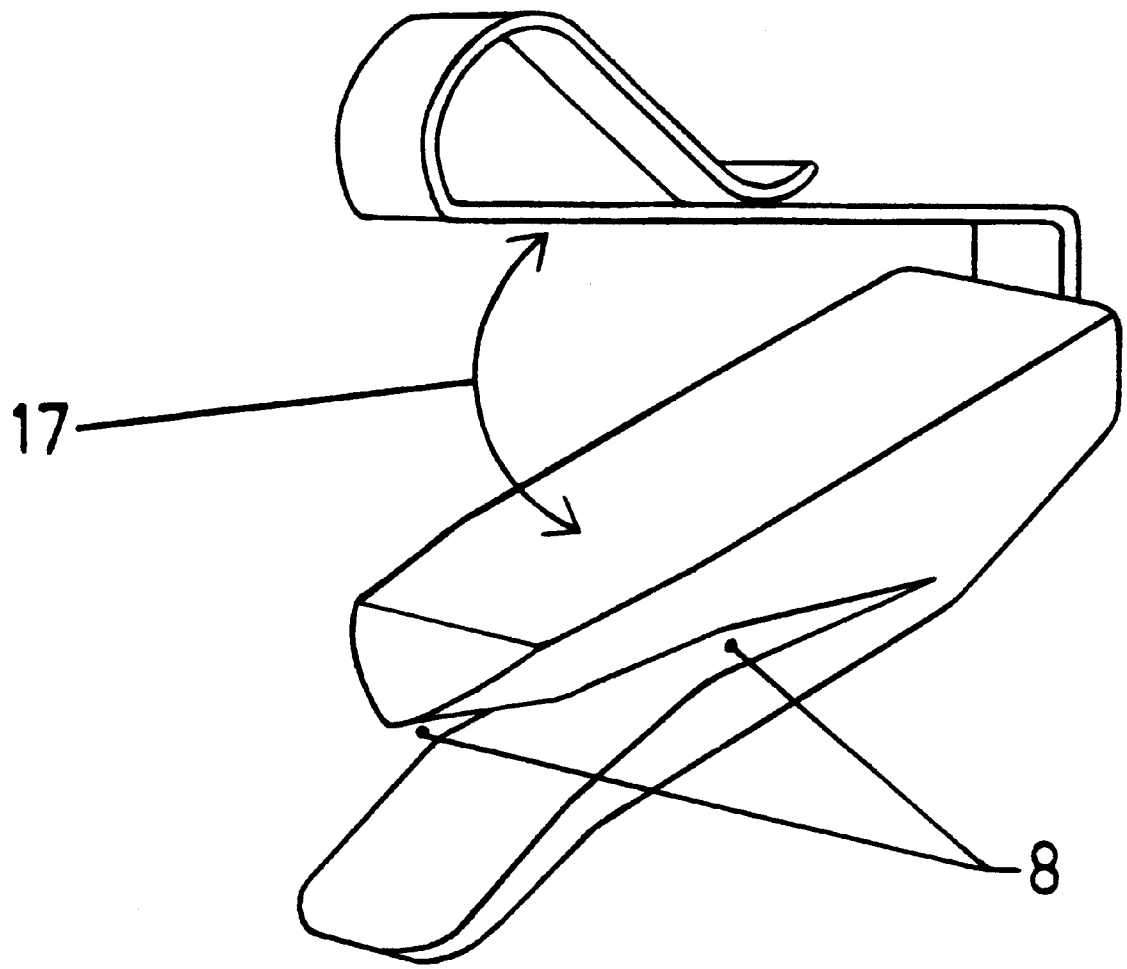
FIG. 3 is a perspective view of this invention, the flexible, open position of the holder when the eyeglasses are being inserted.

The operation of the preferred embodiment is as follows. First, attach the clamp 5 (FIG. 1) side of the clip 9 (FIG. 2) to a visor 4 (FIG. 1). Grab folded eyeglasses by their hinges 16 or by their brims 15. Slide the eyeglasses onto the ramp 6 allowing the bridge 2 of the eyeglasses to follow the bridge guide 7. While pulling gently downward creating a gap 17 (FIG. 3), continue to slide the eyeglasses into the cavity 8 until the bridge 2 (FIG. 1) of the eyeglasses are seated firmly against the bridge guide 7 of the holder and the temple bars 1 lie between the body 10 (FIG. 2) and the clip 9.

Once the eyeglasses are in place, gently allow the eyeglass holder to flex back into its normal position. This closes the gap 17 (FIG. 3) therefore holding the eyeglasses firmly into place by the temple bars 1 (FIG. 1) flush against the visor 4. To remove the eyeglasses from the holder simply grab the eyeglass by the eyeglass brims 15 or their hinges 16 and slide straight out and down the ramp 6. The above description of operation can and should be performed using one hand.

SUMMARY, RAMIFICATIONS AND SCOPE

Accordingly the reader will see that this holder for securing eyeglasses to a visor is convenient, easy to use, flexible, resilient and non-obstructive to the operator of the vehicle.

Although the description above contains many specifications, they should not be construed as limiting the scope of the invention, but as merely providing illustrations of some of the presently preferred embodiments of this invention. For example the size of the whole or specific parts of the eyeglass holder can vary. Also rather than making the eyeglass holder two parts of one the body and two the clip, the eyeglass holder can be made as one whole piece. Also any person skilled in the art or science of which this invention pertains would make the eyeglass holder using the following materials; plastic, metal, wood, cork, and rubber.

Thus the scope of the invention should be determined by appended claims and their legal equivalents rather than by the examples given.

I claim:

1. An eyeglass holder comprising a body and a clip; wherein said body having two sides a top, a back end with a slit, a bottom with an extension forming a ramp, and an open front with a bridge guide and a cavity for accepting eyeglasses in the folded position at the bridge, with the lenses facing down; wherein said clip is approximately the length of the top of said body, furthermore having a curve on one end forming a clamp for securing said body to a visor; and on the opposite end curving in the opposite direction of said clamp forming a hook for attaching said clip to said slit of said body forming the completed eyeglass holder which is easy to use, convenient, and non-obstructive to the user wherein said cavity is most open at the front end and gradually closes to seat eyeglasses firmly at the bridge as said eyeglasses move deeper into the cavity and down said ramp.

2. An eyeglass holder as defined in claim 1 wherein said ramp is an extension of the bottom of the body and as a whole is longer than the top of said body, constructed to ease the manual insertion of eyeglasses into the cavity; furthermore at the front end said ramp gradually ascends peaking at approximately the center of said cavity, then gradually descends towards the closing of said cavity to secure said eyeglasses into place.

3. An eyeglass holder as defined in claim 1 wherein said clip is made of flexible, resilient material.

4. An eyeglass holder as defined in claim 1 wherein said bridge guide is thinnest at the front and widens as said bridge guide moves towards the closing of the cavity to seat the eyeglasses at the bridge as said eyeglasses move deeper into said cavity.

5. An eyeglass holder as defined in claim 1 wherein said clip is flexible; furthermore while the eyeglasses are being manually inserted, said clip flexes, temporarily separating the body from the visor; then after said eyeglasses are inserted into the cavity, said clip automatically flexes back into said clip's normal position holding said eyeglasses firmly by the temple bars between said visor and said body.

* * * * *